Oct. 4, 1966   H. H. MERRIMAN   3,276,798
BALL-AND-SOCKET CONNECTION
Original Filed Oct. 10, 1962

INVENTOR
HENRY H. MERRIMAN
BY Beaman & Beaman
ATTORNEYS

United States Patent Office 3,276,798
Patented Oct. 4, 1966

3,276,798
BALL-AND-SOCKET CONNECTION
Henry H. Merriman, 751 W. Washington St.,
Jackson, Mich.
Original application Oct. 10, 1962, Ser. No. 229,553, now Patent No. 3,219,336, dated Nov. 23, 1965. Divided and this application Sept. 7, 1965, Ser. No. 485,236
2 Claims. (Cl. 287—21)

This invention is a division of my copending United States application Serial No. 229,553, filed October 10, 1962, now Patent No. 3,219,336.

The invention pertains to a ball-and-socket connection, and particularly relates to a ball-and-socket connection which may be readily assembled and disassembled.

The ball-and-socket connection of the invention is of the type which may be employed with, but is not limited to, C-clamp applications, wherein a threaded shaft is employed in combination with a threaded bore to produce a clamping or compression force by axially translating the shaft due to rotation of the shaft relative to the bore, and thereby producing an axial feeding movement of the shaft. In this type of clamping device it is common to affix a pressure foot to the end of the threaded shaft by a ball-and-socket connection for self-alignment of a pressure pad with the article being clamped. Usually, these ball-and-socket connections are of the permanent type where the socket is swaged or rolled to grip the ball and if the pressure pad is damaged, the entire clamp must be discarded. Furthermore, if a specially shaped pressure pad is desired, or a fixture is to be welded to the pad, an entire clamp must be set aside for this special purpose if the pad is not removable from the threaded shaft of the clamp.

It is a basic object of the invention to provide a ball-and-socket connection which may be used with a pressure foot of a pressure type clamp to permit easy and quick assembly or removal of the foot from the threaded shaft of the clamp to enable a variety of pressure foot configurations to be utilized with a single clamp.

A further object of the invention is to provide a ball-and-socket connection wherein the ball may be readily maintained within or removed from the socket.

An additional object of the invention is to provide a ball-and-socket connection wherein the ball is maintained within the socket by a retainer threaded to the socket forming member wherein a ball-receiving opening is defined in the retainer for selective alignment with said ball.

Figure 1:
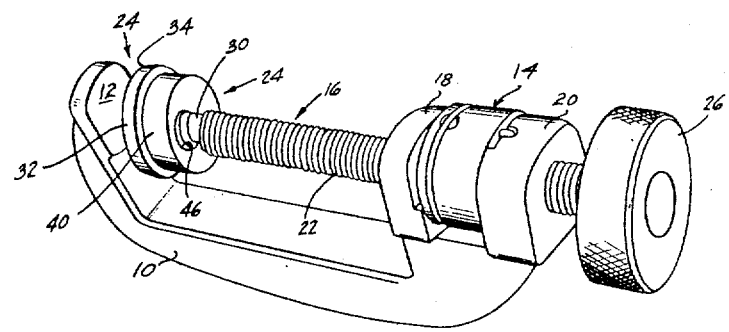
Figure 2:
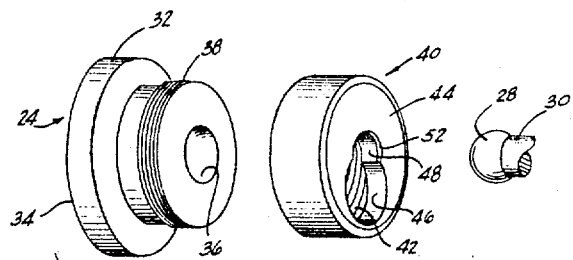
Figure 3:
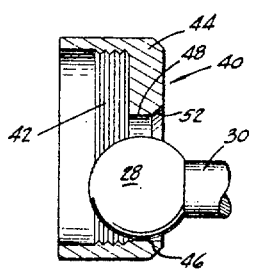
Figure 4:
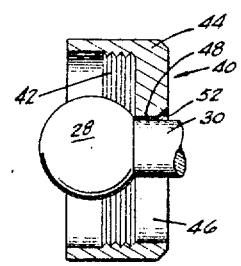
Figure 5:
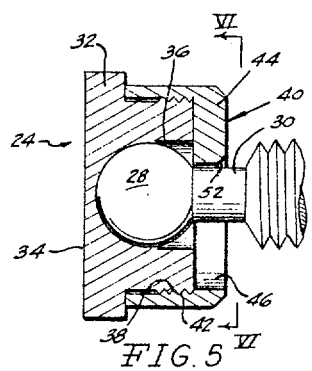
Figure 6:
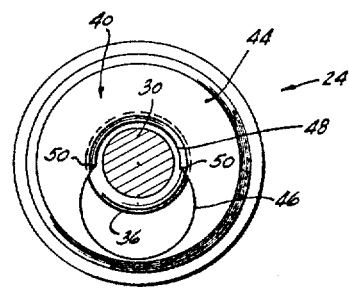

These and other objects of the invention arising from the relationships and details of the components of an embodiment of the invention will be apparent from the following description and accompanying drawings wherein:

FIG. 1 is a perspective view of a C-clamp employing the ball-and-socket connection of the inventive concept, FIG. 2 is an exploded, perspective view of the components of the invention, FIG. 3 is an elevational, diametrical, sectional view of the ball being inserted through the retainer opening, FIG. 4 is a view similar to FIG. 3 after the ball has been inserted through the retainer opening and coaxially aligned with the retainer, FIG. 5 is an elevational, diametrical, sectional view of the assembled ball-and-socket connection, and FIG. 6 is a sectional view along section VI—VI of FIG. 5.

For purposes of illustration, and to illustrate a particularly useful application of the inventive concept, the ball-and-socket connection of the invention will be described as employed with a C-clamp. However, it will be appreciated that the ball-and-socket connection may be employed with any type of apparatus wherein its features are of advantage. A C-clamp using the invention may include the usual C-shaped body member 10 having a fixed jaw or anvil 12 defined at one end, and a pressure unit 14 is defined at the other end. The pressure unit 14 is of the type disclosed in the aforementioned application. The support for the threaded shaft 16 includes spaced elements or bosses 18 and 20 which are an integral part of, or firmly attached to, the C-clamp body. The bosses 18 and 20 are provided with coaxial bores which are of sufficient diameter as to support the threaded shaft 16 for axial sliding movement therethrough.

The threaded shaft 16 is threaded throughout its length with threads 22, and is provided at the inner end, which is disposed in opposed relation to the fixed jaw 12, with a pressure foot 24, which is pivotally mounted on the threaded shaft by the ball-and-socket connection of the invention. The other end of the shaft 16 is provided with a knob or handle 26 to facilitate rotation of the shaft. The pressure unit 14 includes a threaded nut whereby rotating of shaft 16 translates the foot 24 toward and away from the anvil 12.

The end of shaft 16 is provided with a spherical ball 28 which connects to the shaft by means of a cylindrical neck 30 of reduced diametrical dimension with respect to ball 28. The pressure foot 24 includes a pressure pad 32 having a clamped member engaging surface 34, and a socket 36 is defined within the pad having a concave surface substantially complementary to that of ball 28 and of a size so as to receive the ball. A threaded portion 38 is defined on the pad concentric with the socket 36.

The pressure foot 24 also includes a retainer member 40 which is of an annular configuration having an internal thread 42, which is adapted to mate with threads 38, and a radial wall 44. The wall 44 is provided with a large circular opening 46 which is of a diameter at least slightly larger than that of ball 28, and the axis of opening 46 is eccentrically related to the axis of retainer 40. A second circular opening 48 is defined in retainer wall 44 coaxially related thereto. As will be apparent from FIG. 6, the opening 48 is smaller than opening 46 and is of a diameter smaller than that of ball 28 but greater than that of neck 30. The openings 46 and 48 intersect in such a manner that the distance separating opening intersections 50 is greater than the diameter of neck 30.

To attach the pressure foot 24 to the shaft 16, the retainer 40 is positioned relative to the shaft so that ball 28 is inserted through opening 46 as in FIG. 3. Thereupon, the retainer is moved radially to slip the neck 30 between intersections 50 and into coaxial relation with opening 48, as in FIG. 4. The pad 32 is then aligned with the retainer wherein threads 38 and 42 will mate and rotation of the pad relative to the retainer will affix the ball 28 within socket 36. As will be apparent from FIG. 5, the assembled components are so dimensioned that the retainer retains the ball within socket 36 preventing significant axial movement of the foot relative to the shaft 16, and the fact that opening 48 is of larger diameter than neck 30, permits the pressure foot to swivel on the ball 28 within socket 36 providing angular adjustment of the foot on the shaft. If desired, the outer edge of opening 48 may be countersunk to provide a conical surface 52 for increasing the degree of swivel adjustment. As the socket 36 prevents alignment of opening 46 with ball 28, the pressure foot cannot be inadvertently removed from the shaft 16.

Removal of the pressure foot from the shaft 16 is accomplished by reversing the assembly steps described above. As it is often desired to weld a fixture to the pad 32, or employ a custom-shaped pad with the C-clamp, the easily facilitated assembly and disassembly of the pressure foot construction is of considerable advantage over those constructions wherein the pressure foot is permanently attached to the threaded shaft as by swaging or the like.

It will be understood that various modifications to the invention may be apparent to those skilled in the art without departing from the spirit and scope thereof, and it is intended that the invention be defined only by the following claims.

I claim:
1. A ball-and-socket connection comprising, in combination, a ball supporting member, a cylindrical neck defined on said member having an outer end, a spherical ball affixed to said neck outer end having a diameter greater than the diameter of said neck, a socket defining member having an elongated recess defining a socket adapted to closely receive said ball and a shoulder defined on said socket defining member transversely disposed to the axis of said recess, threads defined on the outer periphery of said socket defining member concentrically related to said recess, a cup-shaped retainer having an axis and an integral end wall of a thickness less than the length of said neck, threads defined on the inner periphery of the side wall of said cup-shaped retainer concentric to said retainer axis and engaged with the threads on the outer periphery of said socket defining member for removably affixing said retainer thereto, a shoulder defined on said retainer transversely disposed to said axis of said retainer, said retainer shoulder being engaged with said socket defining member shoulder to lock said ball within said recess, the axial extent of the ball located in said recess being less than the axial distance from the bottom of said recess to said retainer end wall to prevent binding of said ball, a first circular opening defined in said retainer end wall eccentrically related to said retainer axis and of a diameter at least as large as that of said ball, a second circular opening defined in said retainer end wall concentric to said retainer axis and of a diameter greater than that of said neck and less than that of said ball, said openings lying completely within the periphery of said retainer end wall, said openings intersecting each other so as to provide an area of intersection with a dimension greater than that of said neck, whereby said ball may be inserted through said first opening and said neck translated into said second opening, threading of said socket defining member to said retainer retaining said ball within said recess and said recess maintaining said neck within said second opening.

2. In a ball-and-socket connection as in claim 1 wherein said socket defining member shoulder comprising an end wall surrounding said recess and said retainer end wall forms said retainer shoulder whereby said socket defining member end wall is engaged by said retainer end wall.

References Cited by the Examiner

UNITED STATES PATENTS

| 142,293 | 8/1873 | St. John. | |
| 1,399,461 | 12/1921 | Childs | 287—87 |
| 2,817,551 | 12/1957 | Gieleghem. | |
| 3,052,462 | 9/1962 | Butler | 269—261 X |

FOREIGN PATENTS

| 656,574 | 2/1938 | Germany. |
| 211,991 | 3/1924 | Great Britain. |

CARL W. TOMLIN, *Primary Examiner.*

A. V. KUNDRAT, *Assistant Examiner.*